Jan. 13, 1925.
H. A. WOOD
PNEUMATIC TIRE VALVE
Filed April 8, 1921
1,522,567
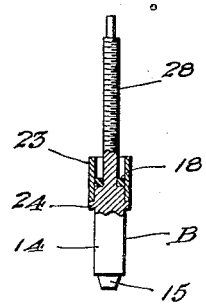
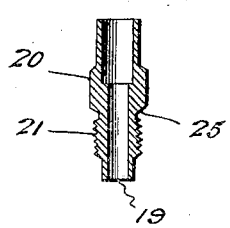
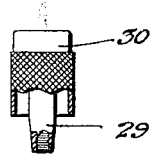
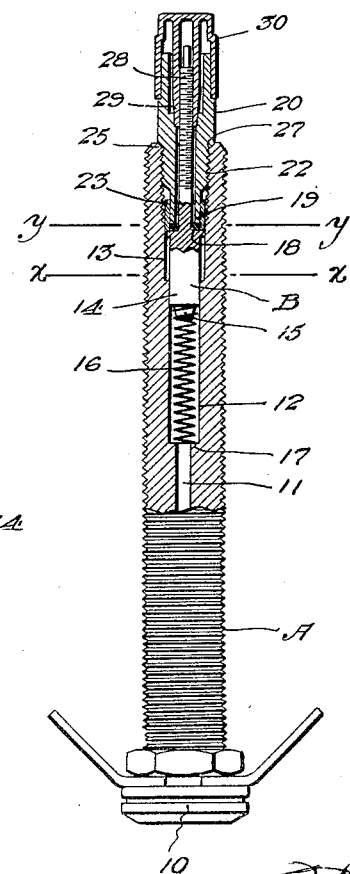
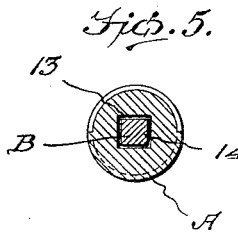
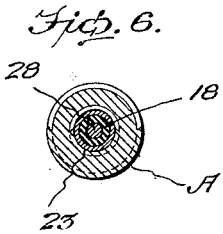
H. A. Wood
INVENTOR
WITNESS:
BY
ATTORNEY Patented Jan. 13, 1925.

1,522,567

UNITED STATES PATENT OFFICE.

HENRY ALFRED WOOD, OF KINGSTON, ONTARIO, CANADA.

PNEUMATIC-TIRE VALVE.

Application filed April 8, 1921. Serial No. 459,710.

*To all whom it may concern:*

Be it known that I, HENRY ALFRED WOOD, a subject of the King of Great Britain, residing at the city of Kingston, in the Province of Ontario and Dominion of Canada, have invented certain new and useful Improvements in Pneumatic-Tire Valves, and do hereby declare that the following is a full, clear, and exact description of my invention, such as will enable those skilled in the art to which it appertains to make and use the same.

This invention relates to improvements in pneumatic tire valve of the type in which the valve is adapted to be turned against its seat by turning of the valve cap and in which the valve seat is formed on a removable portion of the valve stand and the objects of the invention are to make a more effective and air tight joint between the removable part of the valve stand and the remainder of the stem, to provide means for preventing the withdrawal of the gasket on the valve seat when the tire is exhausted by mechanical means, to provide means for preventing turning of the valve in the stand and generally to improve and simplify the construction of the various parts of the valve to better adapt them to perform the functions required of them, and it consists essentially of the improved construction hereinafter described in detail in the accompanying specification and drawing.

In the drawings:—

Figure 1 is an elevation of an embodiment of the invention partially broken away and in section to better show the construction of the working parts.

Figure 2 is a sectional elevation of the removable portion of the valve stem.

Figure 3 is a sectional elevation of the valve parts.

Figure 4 is a sectional elevation of the cap.

Figure 5 is a sectional detail on the line *x—x*, Figure 1.

Figure 6 is a sectional detail on the line *y—y*, Figure 1.

In the drawings, like characters of reference indicate corresponding parts in all the figures.

Referring to the drawings:

A represents a valve stem externally screw threaded provided at the inner end with attaching means 10 by which it may be connected to a pneumatic tire or the like. This attaching means is such as is well known in the art and does not form part of the present invention. The valve stem is provided with a central air passage way 11 which is formed with an inner enlarged portion 12 at the outer end to receive the valve element B and with an outer enlarged portion 13 which is adapted to fit the head of the valve piece. The valve piece B includes an inner portion 14 which is square in cross section and which fits the correspondingly square passage way 12, the portion 12 being formed on the inner end with a projection 15 which engages the end of a spring 16 extending between the valve piece B and the shoulder 17 formed between the juncture of the passage ways 11 and 12. The valve piece carries a gasket 18 adapted to bear against the valve seat 19 formed on a tubular sleeve 20 which is connected to the stem by means of screw threading 21 on the sleeve 20 which engages corresponding threading 22 on the portion 13 of the air passage way.

In order to effectually retain the gasket 18 in position and prevent its withdrawal when, for instance, the tire is exhausted by mechanically operated vacuum producing means, I provide a sleeve or collar 23 which fits around the gasket and projects beyond the same, the said collar abutting a flange 24 formed on the valve piece and being adapted to project over the edge of the sleeve 20 when the gasket 18 is drawn against the valve seat 19. The collar 23 will be retained in position by friction between the collar and the cylindrical portion of the valve piece which it embraces and may, if desired, be soldered or brased or otherwise fastened thereto.

To prevent leakage of air between the sleeve 20 and the stem A, I provide a tapered or conical seat 25 on the sleeve, tapered to abut a correspondingly tapered sleeve 27 on the stem.

The valve piece B is formed with a threaded stem 28 which projects outwardly over the outer end and is designed to be engaged by an internally screw threaded retaining sleeve 29 formed on the interior of the cap 30, the cap fitting over the outside of the sleeve 20 and having sliding engagement therewith. In this way, when the cap is turned, the valve piece will be drawn firmly against the seat 19. When the cap is removed, the valve piece may be moved inwardly under pressure to permit air to pass to the pneumatic tire, the spring 16 returning it to its seat and preventing escape of air.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:—

1. A valve of the character described comprising a stem having an air passage way formed with a square portion, a valve piece having a portion squared to fit the square portion of the air passage way, a removable sleeve connected to the stem having a valve seat for the valve, a spring normally holding the valve seat against the valve, a cap mounted on the sleeve and connecting means between the cap and the valve piece.

2. A valve of the character described comprising a valve stem having a central air passage way formed with an inner square enlarged portion and an outer enlarged portion of greater diameter than the inner enlarged portion, a valve seat disposed within the stem formed with a square portion to fit the inner enlarged portion and having a flange fitting the outer enlarged portion, a collar fitting on the flange, a gasket held within the collar, a stem projecting outwardly from the valve piece, a sleeve having screw threaded engagement with the stem and formed with a valve seat against which the gasket is designed to bear, a cap fitted to the sleeve and having means to engage with the threaded stem of the valve piece.

3. A valve of the character described comprising a valve stem having an air passage way formed with inner and outer enlarged portions, the outer enlarged portions being larger than the inner enlarged portions, a valve piece fitting within the outer enlarged portion having a portion projecting into the inner enlarged portion, spring means in the inner enlarged portion forcing the valve outwardly, means for preventing turning of the valve piece with respect to the stem, a sleeve member having a screw threaded engagement with the stem and designed to form a continuation thereof, being formed on the inner end with the valve seat, a gasket on the valve piece adapted to engage the said valve seat.

4. A valve of the character described comprising a valve stem having an air passage way formed with inner and outer enlarged portions, the outer enlarged portions being larger than the inner enlarged portions, a valve piece fitting within the outer enlarged portion having a portion projecting into the inner enlarged portion, spring means in the inner enlarged portion forcing the valve outwardly, means for preventing turning of the valve piece with respect to the stem, a sleeve member having screw threaded engagement with the stem and designed to form a continuation thereof, being formed on the inner end with a valve seat, a gasket on the valve piece adapted to engage the said valve seat, an outwardly projecting threaded stem on the valve piece and a cap mounted on the sleeve having means to engage with the threaded stem on the valve piece.

5. A tire valve of the character described, comprising a valve stem, a removable valve seat mounted therein, and a vale piece within the stem normally engaging the seat, said valve piece being entirely separate from the seat and movable out of engagement therewith.

6. A tire valve comprising a valve stem, a sleeve forming an extension of the valve stem and having the inner end thereof inserted in the stem to form a seat, a valve normally engaging said seat, a valve stem carried by the valve and projecting outwardly through the said sleeve and a valve cap telescoping the outer end of the sleeve and having screw threaded engagement with said valve stem.

7. A valve of the character described comprising a valve stem having inner and outer enlarged portions, the outer enlarged portion being larger than the inner enlarged portion and the latter being squared in cross section, a valve piece fitting within the outer enlarged portion having a squared portion projecting into the inner enlarged portion, spring means in the inner enlarged portion forcing the valve outwardly, a sleeve threaded into the outer end of the stem and having its inner end formed to present a valve seat, a gasket on the valve piece adapted to engage the said valve seat, a retaining collar for the gasket fitting around the same and adapted for telescoping engagement with the inner end of the sleeve when the gasket is engaged with the valve seat, a threaded stem projecting from the valve seat outwardly through said sleeve, a cap slidable on the outer end of the sleeve, and a tube carried by the cap having threaded engagement with said stem.

HENRY ALFRED WOOD.